United States Patent [19]
Kong et al.

[11] Patent Number: 5,937,431
[45] Date of Patent: Aug. 10, 1999

[54] MULTI- NODE, MULTI-LEVEL CACHE- ONLY MEMORY ARCHITECTURE WITH RELAXED INCLUSION

[75] Inventors: Jin-seok Kong, Minneapolis; Gyung-ho Lee, Plymouth, both of Minn.

[73] Assignee: Samsung Electronics Co., Ltd., Suwon, Rep. of Korea

[21] Appl. No.: 08/679,082

[22] Filed: Jul. 12, 1996

[51] Int. Cl.[6] .................................................. G06F 12/12
[52] U.S. Cl. ........................ 711/145; 711/133; 711/148; 364/134
[58] Field of Search ................... 711/133, 145, 711/147, 148; 364/134

[56] References Cited

U.S. PATENT DOCUMENTS

| | | | |
|---|---|---|---|
| 4,755,930 | 7/1988 | Wilson, Jr. et al. | 711/145 |
| 4,939,641 | 7/1990 | Schwartz et al. | 711/145 |
| 5,274,787 | 12/1993 | Hirano et al. | 711/143 |
| 5,377,345 | 12/1994 | Chang et al. | 711/118 |
| 5,394,555 | 2/1995 | Hunter et al. | 711/148 |
| 5,459,852 | 10/1995 | Nakagawa et al. | 711/133 |
| 5,535,116 | 7/1996 | Gupta et al. | 364/134 |
| 5,564,035 | 10/1996 | Lai | 711/144 |
| 5,692,149 | 11/1997 | Lee | 711/133 |

OTHER PUBLICATIONS

Norman P. Jouppi, "Improving Direct–Mapped Cache Performance by the Addition of a Small Fully–Associative Cache and Prefetch Buffers", 1990 IEEE; pp. 364–373.

Norman P. Jouppi et al., "Tradeoffs in Two–Level On–Chip Caching", 1994 IEEE; pp. 34–45.

Kong, J.; Lee, G. "DYMA: A Novel Memory Architecture for Distributed Shared Memory Multiprocessors", DICE Project Technical Report #14, May 1995.

The Publications of Gyungho Lee [Online:] Available http://www–mount.ee.umn.edu/~ghlee/papers.html, Jun. 1995.

Kong, J.; Lee, G. "Relaxing Inclusion Property in Cache Only Memory Architecture." Proceedings of EURO–PAR '96, Lyon, France, Aug. 1996.

Hagersten, E.; Landin, A.; Haridi, S. "DDM—A Cache–Only Memory Architecture." IEEE Computer, vol. 25(9) (Sep. 1992): 44–54.

*Primary Examiner*—Eddie P. Chan
*Assistant Examiner*—Yamir Encarnacion
*Attorney, Agent, or Firm*—Jones Volentine, L.L.P.

[57] ABSTRACT

A data processing apparatus having a memory access architecture which utilizes distributed shared-memory multiprocessors, and relates more particularly to a non-inclusive memory access mechanism in said architecture. The local memory in each node of shared memory is utilized as a backing store for blocks discarded from the processor cache to delay the address binding to the local memory until the blocks are discarded from the processor cache. Such avoids enforcement of the inclusion property and long latency due to the inclusion property. The invention further provides a method of maintaining coherency in a system which utilizes a distributed shared-memory multiprocessors architecture.

3 Claims, 9 Drawing Sheets

Time $t_0$: initial configuration

Time $t_1$ ($P_i$ read E): block E is shared by $P_i$ and $P_j$

Time $t_2$ ($P_j$ wirte E): block E in $P_i$ is invalidated

MULTI- NODE, MULTI-LEVEL CACHE-ONLY MEMORY ARCHITECTURE WITH RELAXED INCLUSION

BACKGROUND OF THE INVENTION

The present invention relates to a computer memory access mechanism for distributed shared-memory multiprocessors, and relates more particularly to a non-inclusive memory access mechanism.

In the present invention the local memory in each node of shared memory is utilized as a backing store for blocks discarded from the processor cache to delay the address binding to the local memory until the blocks are discarded from the processor cache. Such avoids enforcement of the inclusion property and long latency due to the inclusion property.

Cache-coherent non-uniform memory architecture (CC-NUMA), such as the Stanford DASH, and cache only memory architecture (COMA), such as the Kendall Square Research KSR-1, are two well-known Distributed Shared Memory (DSM) architectures. Under hardware control, both such architectures provide dynamic data migration and replication at processor caches. The difference between COMA and CC-NUMA is that COMA organizes each node's local memory as a cache to shared address space without traditional main memory, while CC-NUMA utilizes each node's local memory as a portion of shared main memory.

COMA provides dynamic migration and replication of memory blocks at the local memory under hardware control. There is some redundancy in a COMA machine between the processor cache and the local memory because there is an over-lapping of functionality (an inclusion property). COMA treats the memory local in each node, called attraction memory (AM), as a cache to the shared address space and binds the address of data to the AM block frame when the data are brought to a node as in the traditional processor cache. Such a system which organizes the local memory as a cache has a disadvantage of requiring the overhead of tag storage and additional unallocated storage space for replicated data.

Also, the AM in a COMA machine needs coherence enforcement which may create larger overhead than in traditional multiprocessors because of its huge size and the lack of traditional memory. Due to memory block placement in such a machine, when a miss happens at an AM, a block may need to be replaced to make space for the block coming from a remote node to satisfy the miss. Since the replaced block may be the last valid copy in the system, in order to avoid disk write-back, it is desirable to have the block be relocated to some other AM that has space for it. Finding a node whose AM has space for the replaced block can create a serious problem, although a hierarchical directory scheme can provide a deterministic searching mechanism.

In COMA machines, the size of a typical AM is relatively large compared to traditional cache memory. Although this huge size of the AM tends to eliminate capacity misses, it may also create more coherence activity, longer memory access latency, and increased memory overhead. COMA machines generally utilize an invalidation policy for enforcing coherency. Also, the inclusion property is generally applied between the processor cache and its AM as in multilevel processor caches: i.e., the cache of a processor is always a subset of its AM. As such, a memory block invalidation at the AM causes any corresponding data in the processor caches of the node to be invalidated.

With the large block size of AM in COMA machines, as compared to traditional processor cache memory, the inclusion property creates premature invalidations at the caches and may offset the advantage of low capacity misses provided by AM. Such can cause excessive coherence traffic due to higher probability of memory block being in a "shared" state. With the invalidation policy, this will limit the attainable hit rate at the AM.

Accesses to a slow AM introduce long inter/intra-node communication latency. By broadcasting invalidation signals to the processor cache when a block in the AM is replaced or by attaching an inclusion bit, which indicates whether or not a copy of the data is in the processor cache or not, to each AM block entry, the inclusion property can be enforced. However, both of the schemes generate intra-node traffic which make longer the critical path of the memory access latency.

By contrast, in CC-NUMA machines there is no inclusion property between the processor cache and its local memory. In most cases, the shared data in the processor cache, which will be invalidated, do not exist in the local memory of a CC-NUMA machine. This saves memory space and reduces the number of accesses to the slow local memory in CC-NUMA machines as compared to those accesses in COMA machines.

COMA has the disadvantage of having longer latency for some memory accesses than CC-NUMA; in particular, higher network latency has been observed to be incurred by the hierarchical directory scheme in COMA. Although non-hierarchical COMA-F can reduce the network latency overhead, the data accesses caused by cache misses can still have longer latency than in CC-NUMA because of the time required for checking the tag of the AM that is necessary for the accesses.

Moreover, the inclusion property enforced between the processor cache and its AM causes frequent accesses to the AM. For example, consider the following situation in view of the simple configuration shown in FIG. 1A–1C, which show two nodes ($P_i$ and $P_j$) at three different sequential points in time, wherein each node includes a single processor, 2 processor cache blocks and 4 AM cache blocks.

Initially (at $t_0$ see FIG. 1A), at $Node_i$ the processor cache of processor $P_i$ is using memory blocks A and D while its 4-block AM contains memory blocks A–D, and at Node; one of the processor cache blocks being used by processor $P_j$ is block E, while one block of its AM is block E. If processor $P_i$ wants to dump its block A to read the shared block E at time $t_1$, the block A in the $Node_i$ AM needs to be replaced by block E to maintain the inclusion storage of block E at $Node_i$ by copying E to the AM spot originally occupied by block A at $Node_i$ and then to the $P_i$ processor cache (see FIG. 1B). Further, if the AM block A to be replaced by block E is the last copy of that block on the system it must be relocated to a remote AM site which is free at another node, which requires at least two more AM accesses (a read and a write) to store block A at a remote location.

Moreover, as illustrated in FIG. 1C, if at time $t_2$ the processor $P_j$ at $node_j$ writes to data in its block E processor cache, then all block E copies at the AM cache locations (at both nodes) must be invalidated under the write-invalidation policy as well as the $P_i$ processor cache block E, leaving the only valid copy of block E as the just written copy of block E at the $P_j$ processor cache. Access to the AM tag is necessary to invalidate the block E at $node_i$. Using traditional schemes to enforce the inclusion property results in the critical path of the memory access latency increasing.

Allowing direct access to the processor cache for the incoming message from the network can hide the extra AM accesses from the critical path of the memory access latency. However, the extra AM accesses can still make other memory access latency longer due to contention at the AM.

Because of the ill effects of the inclusion property in COMA machines, it may be advantageous to relax the inclusion property somewhat to improve their performance. However, if the inclusion property is relaxed just for read-only (shared) data, there is a limitation in taking advantage of CC-NUMA since the writable (shared) block can be in an invalidated state. Also, the read-only block may be replaced soon from the node since the processor cache is small. This may decrease the hit rate if the read-only is referenced shortly thereafter. If the writable shared block is allowed to reside in the processor cache without saving a copy in the AM, the coherence control may be complicated, since more state information needs to be controlled at the cache.

Further, if address binding of data to an AM frame occurs when a missing block is brought to the node (block-incoming time), the inclusion property may waste the AM space in the sense that a block, which will swapped or invalidated, uses up AM space. If the block is not bound to the AM and the block will not be invalidated in the near future, the block may be replaced from the node due to the small size of the processor cache. Thus, either way limits the utilization of the large caching space of the AM, thereby diminishing the advantage of COMA designed machines.

Accordingly, there is a need for a variation on the COMA design machine to avoid enforcement of the inclusion property and long latency due to the inclusion property.

SUMMARY OF THE INVENTION

The present invention provides a DSM architecture that is a variant on the COMA architecture, which architecture may be characterized as dynamic memory architecture (DYMA), wherein the local memory in each node of the architecture is utilized as a backing store for the blocks discarded from the processor cache to hold such replaced data and delay the address binding of data to the local memory from block-incoming time to block-discarding time.

The present invention also provides a DYMA which delays such address binding to eliminate the inclusion property between the processor cache and the local memory and to allow faster data access by avoiding the COMA architecture reliance on local memory as a larger higher-level cache for the processor cache.

Further, the present invention provides such a memory architecture which will create more usable local memory space and reduce the memory overhead, and thereby potentially improve performance of a DSM architecture.

To achieve these and other advantages and in accordance with the purpose of the invention, as embodied and broadly described, the invention provides for a data processing apparatus having a memory access architecture which utilizes distributed shared-memory multiprocessors, the apparatus comprising means for storing a home directory and having a plurality of nodes, wherein each node comprises:
(a) a processor,
(b) at least one processor cache, with the processor being characterized by (i) means for storing an address tag, (ii) cache means for storing a state of the block identifier, (iii) means for storing a local/global block identifier, and (iv) means for storing a data string block, and (c) at least one Dynamic Memory "DM" cache, with each DM cache being characterized by (i) means for storing an address, (ii) means for storing a state of the block identifier, and (iii) means for storing a data string block.

BRIEF DESCRIPTION OF THE DRAWINGS

The foregoing and other aspects and advantages will be better understood from the following detailed description of a preferred embodiment of the invention with reference to the drawings, in which.

DETAILED DESCRIPTION OF THE INVENTION

Figure 1A:
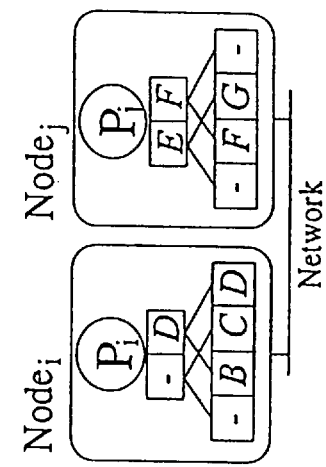
FIGS. 1A–1C are collectively an example of the ill-effects of the inclusion property in a COMA machine.
Figure 1B:
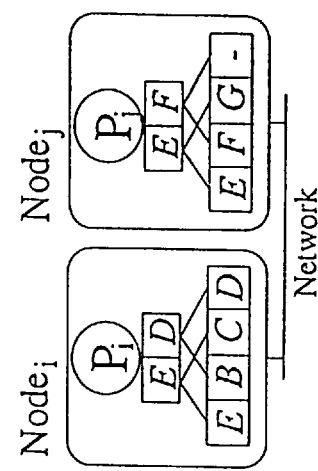
Figure 1C:
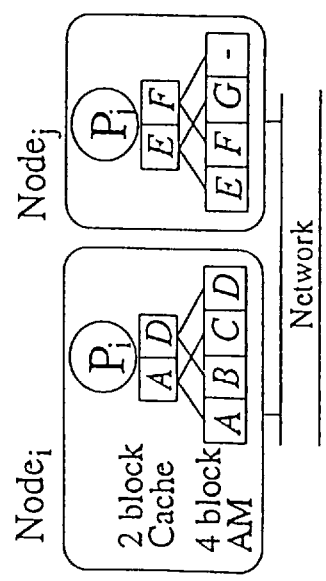

The above objects and advantages of the present invention will become more apparent from the detailed description below and by describing in detail a preferred embodiment thereof with reference to the attached drawings.

In DYMA, the local memory of each node has the facility of dynamic address binding to a memory block frame supported by hardware as in COMA. But instead of using the local memory as a cache for shared address space as in COMA, DYMA uses the local memory as the backing store for the blocks discarded from the processor cache. In particular, instead of binding the address of a block to a local memory frame when the block for a node miss is brought to a node, binding of the address happens when a block is discarded from the cache in DYMA.

Utilizing the local memory in the DYMA way, no write access which hits on a non-shared cache block has to go to the local memory. Additionally, a node miss can be serviced directly from a remote cache and saved directly to its local cache without accessing the slow local AM.

During the time between the block-incoming time and the block-discarding time, the block of the cache can be invalidated, or the block of the local memory can be loaded again. The first case reduces the AM accesses and global replacement traffic, and the second case increases the node hit rate, which in turn reduces global network traffic. These properties can make the average latency of DYMA short while still allowing dynamic data replication and migration from node to node as in COMA.

Binding the address of data to a local memory frame in CC-NUMA happens when a page is loaded due to a page-fault. COMA delays the address binding to a local memory from page-fault time to memory block missing time. The local memory of DYMA, which is referred to as dynamic memory (DM), does not have an inclusion property between it and the processor cache. Unlike the redundancy in COMA, DYMA utilizes the processor cache and the local memory each for a different functionality. Therefore, an advantage in DYMA is that a memory block replication to other nodes is still permitted to occur even if the local memories and the size of the working set of an application are the same (no unallocated space or 100% memory pressure). Under similar circumstances of 100% memory pressure in COMA a block replication may be disallowed, which can result in excessive replacement traffic.

The relationship between the AM of COMA and the DM of DYMA may be compared to the relationship between the "miss cache" and the "victim cache" in that the address of the miss cache is bound at the block-incoming time to the lower level cache as in COMA while the address of the victim cache is bound at the discarding time from the lower level cache as in DYMA. Due to the full associativity of the victim cache, all the victim cache blocks are different from the blocks of the lower level cache. Victim caching is always an improvement over miss caching. The victim caching is extended to the two-level exclusive caching where the large second-level cache is used as a victim cache. The miss and victim caches are designed to decrease average latency by reducing cache misses in uniprocessors, while the AM and the DM are designed to decrease average latency by reducing node misses in multiprocessors.

Figure 2:
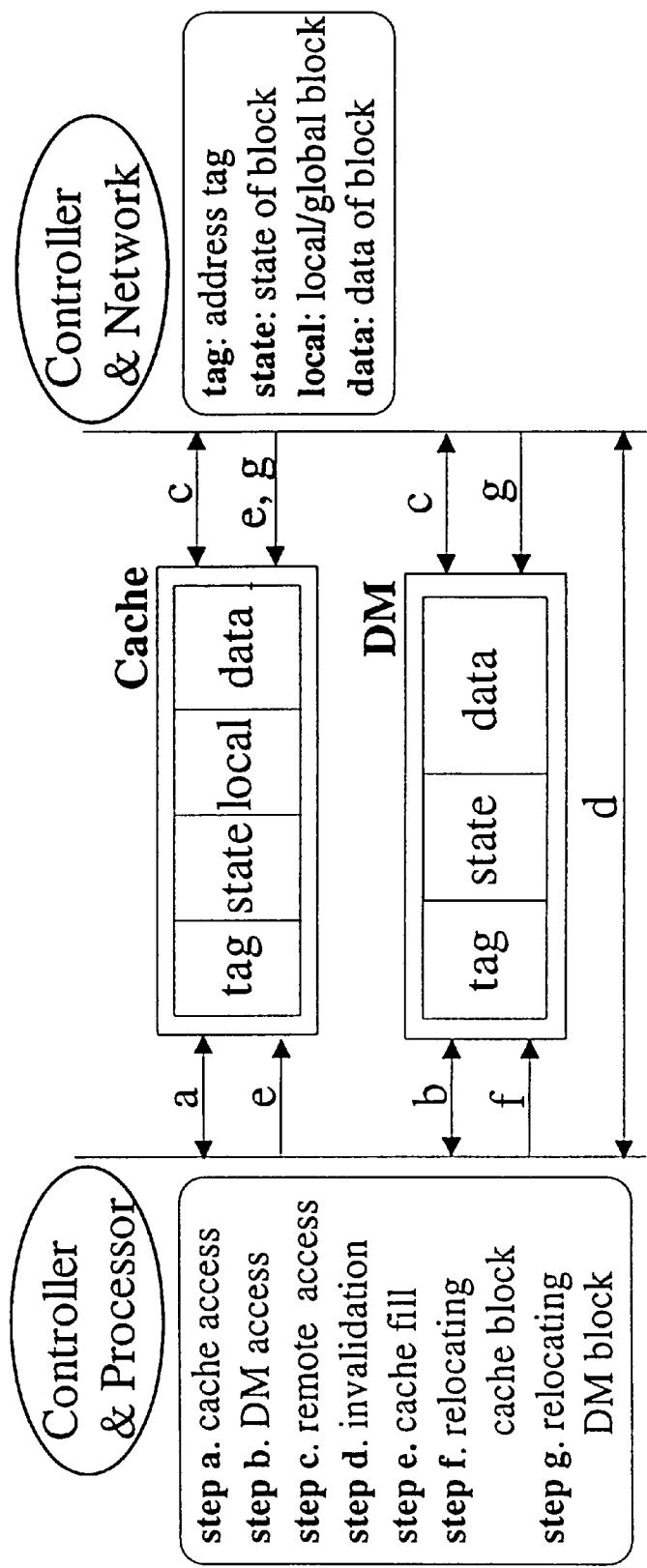
FIG. 2 is an illustration of the memory access mechanism in a DYMA system according to the present invention, wherein assuming two nodes of the system are communicating some of the steps a through g will happen.

FIG. 2 illustrates a preferred first embodiment of the present invention.

The memory access mechanism in DYMA according to the present invention, as illustrated by FIG. 2, assumes a write-invalidation coherence control within a directory-based interconnection network. If all blocks which are discarded from the cache are saved in the DM, another overhead may be incurred. Therefore, according to the present invention only an indispensable block is written to its local memory when it is discarded from the cache. Such a determination is effected by adding one more bit, a "local bit", in each cache block as shown in FIG. 2. The local bit is used to indicate whether the block is from its DM or from the network. All the blocks from the network (global blocks) are saved in its DM when they are discarded from the cache. If a block from its DM (local block) is selected for replacement and it is modified at the cache, it is necessary to write the block in the DM in manner somewhat similar to a write-back cache.

In a preferred embodiment of the invention is provided a data processing apparatus having a memory access architecture which utilizes distributed shared-memory multiprocessors comprising a home directory and a plurality of nodes, wherein each node comprises:

(a) a processor, (b) at least one processor cache, with said processor cache being characterized by (i) a means for storing an address tag, (ii) a means for storing a state of the block identifier, (iii) a means for storing a local/global block identifier, and (iv) a means for storing a data string block, and (c) at least one DM cache, with each DM cache being characterized by (i) a means for storing an address tag, (ii) a means for storing a state of the block identifier, and (iii) a means for storing a data string block.

In a more preferred embodiment of the invention utilizing the local bit and the memory access mechanism according to the invention, said architecture comprises a plurality of nodes having a processor, a processor cache and DM cache at each node, wherein each node provides a means for following a coherency protocol and a means for executing a set of actions comprising the following steps:

(a) accessing a local processor cache, (b) accessing a local DM cache, (c) accessing a remote cache block, (d) invalidating a processor cache block or a DM cache block, (e) filling a data block into a processor cache, (f) relocating a processor cache block, and (g) relocating a DM block.

A preferred aspect of the DSM architecture as described above, provides for accessing a local processor cache as in step (a), above, with said architecture providing for three actions:

(i) giving the data block to the processor if a write hits on a non-shared block or if a read hits on any data block;

(ii) invalidating a processor cache block or a DM cache block if a write hits on a shared data block; or (iii) accessing a local DM cache if a local processor cache miss occurs.

A preferred aspect of the DSM architecture as described above, provides for accessing a local DM cache as in step (b), above, with said architecture providing for three actions:

(i) filling a data block into a processor cache if a write hits on a non-shared block or if a read hits on any data block;

(ii) invalidating a processor cache block or a DM cache block if a write hits on a shared DM cache data block followed by filling a data block into a processor cache; or (iii) trying to find a missing data block through the network if a DM cache data block write miss or read miss occurs by following a series of steps comprising:
(1) going to the home directory of the data block,
(2) finding the owner node of said data block, and
(3) sending a data block request to said owner node of said data block, and obtaining said data block through a remote access of a processor cache block or a remote access of a DM cache block.

A preferred aspect of the DSM architecture as described above, provides for accessing a remote cache block in step (c), above, with said architecture providing for three actions:

(i) checking the remote processor cache for the remote cache block and
(1) copying the remote cache block from said remote processor cache if it exists in said processor cancelling the access to the remote DM cache, delivering the copy of the remote cache block to the requesting node, and filling the remote cache block into the processor cache of the requesting node, or (2) indicating the absence of the remote cache block at said remote processor cache;

(ii) checking the remote DM cache for said requested remote cache block and (1) copying the remote cache block from said remote DM cache if it exists in said DM cache, delivering the copy of the remote cache block to the requesting node, and filling the remote cache block into the processor cache of the requesting node, or (2) indicating the absence of the remote cache block at said remote DM cache; or (iii) returning a message to the requesting node indicating an unsuccessful copy of the remote cache block from the remote access.

A preferred aspect of the DSM architecture as described above, provides for invalidating cache blocks throughout said architecture in step (d), above, with said architecture providing for two actions:

(i) checking the home directory of said architecture and finding all remote nodes that have any copies of the cache data block which is, or are, to be invalidated and (1) sending invalidation signals to the remote nodes, (2) invalidating all the copies of the data block at the remote node or nodes, and (3) continuing processing; or (i) checking the home directory of said architecture and finding all remote nodes that have any copies of the cache data block which is, or are, to be invalidated and (1) sending invalidation signals to the remote nodes, (2) failing to invalidate all the copies of the data block at the remote node or nodes due to a race condition, and (3) retrying accessing the local cache block which had led to said invalidation attempt.

A preferred aspect of the DSM architecture as described above, provides for filling a processor cache block of said architecture in step (e), above, with said architecture providing for two actions:

(i) successfully copying a cache block locally or from elsewhere in the DSM, filling the cache block into said processor cache, and continuing processing, or (ii) failing to successfully copy a cache block locally or from elsewhere in the DSM, continuing looking for said cache block in said DSM, successfully copying a cache block from elsewhere in said DSM, filling the cache block into said processor cache, and continuing processing; wherein when filling the local processor cache block, the local bit of the local processor cache block is set if the data block was obtained from a local DM, else the local bit is reset to indicate that the data block was obtained remotely. If all local processor cache blocks are occupied, one of the processor cache blocks is selected to be replaced. For such a selection any replacement algorithm (such as LRU or a random algorithm) can be used. If the block to be replaced is an unmodified block and the local bit is set, relocating the block at the DM cache is unnecessary since the block already exists in a local DM cache block. If the selected data block does not exist locally it can be relocated using the architecture's set procedures which may overlap the running of the local processor.

A preferred aspect of the DSM architecture as described above, provides for relocating a processor cache block of said architecture in step (f), above, with said architecture providing for two actions:

(i) checking the state of the DM when saving a processor cache block to the DM without generating a further replacement action if the DM has the same address block, or if the DM has an invalid block, or (ii) checking the state of the DM when saving a block to DM from the processor cache block, and replacing a block in the DM with the processor cache block.

Before generating a global replacement message, the DSM checks the processor cache tag to see if the replaced block in the DM exists in the processor cache, because the DM block can exist in the processor cache if any replacement algorithm at the cache is used. If it does, the replacement action is finished. If the replaced block does not exist in the processor cache and the block has ownership in the system, it is necessary to initiate an action which goes to the home directory of the block and selects a node which can keep ownership of the block, followed by a processing step for relocating the replaced DM block at the remote node. A preferred manner for assigning a node as the owner of the replaced block at the home directory is by selecting the node using the following priority sequence: (1) a node which has an identical copy of said replaced DM block, (2) a node which has unused cache space that can be used to save said replaced DM block, and (3) a node which has a space currently occupied by a shared non-owner cache block (duplicate block) that can be readily overwritten by said replaced DM block.

A preferred aspect of the DSM architecture as described above, provides for relocating a DM cache block of said architecture in step (g), above, with said architecture providing for two actions:

(i) locating a remote node with a identical copy of the replaced DM cache block and changing the state of the remote node at the directory to owner of the replaced DM cache block without having to perform a DM cache fill step, or (ii) locating at a remote node an invalid DM cache block or a different shared non-owner DM cache block, performing a DM cache fill procedure to replace the remote DM cache block with the replaced DM cache block and changing the DSM directory to indicate the change of ownership of said replaced DM cache block to the remote node location.

In a second preferred embodiment, the present invention also provides coherence and replacement protocols for a DYMA architecture.

Figure 4:
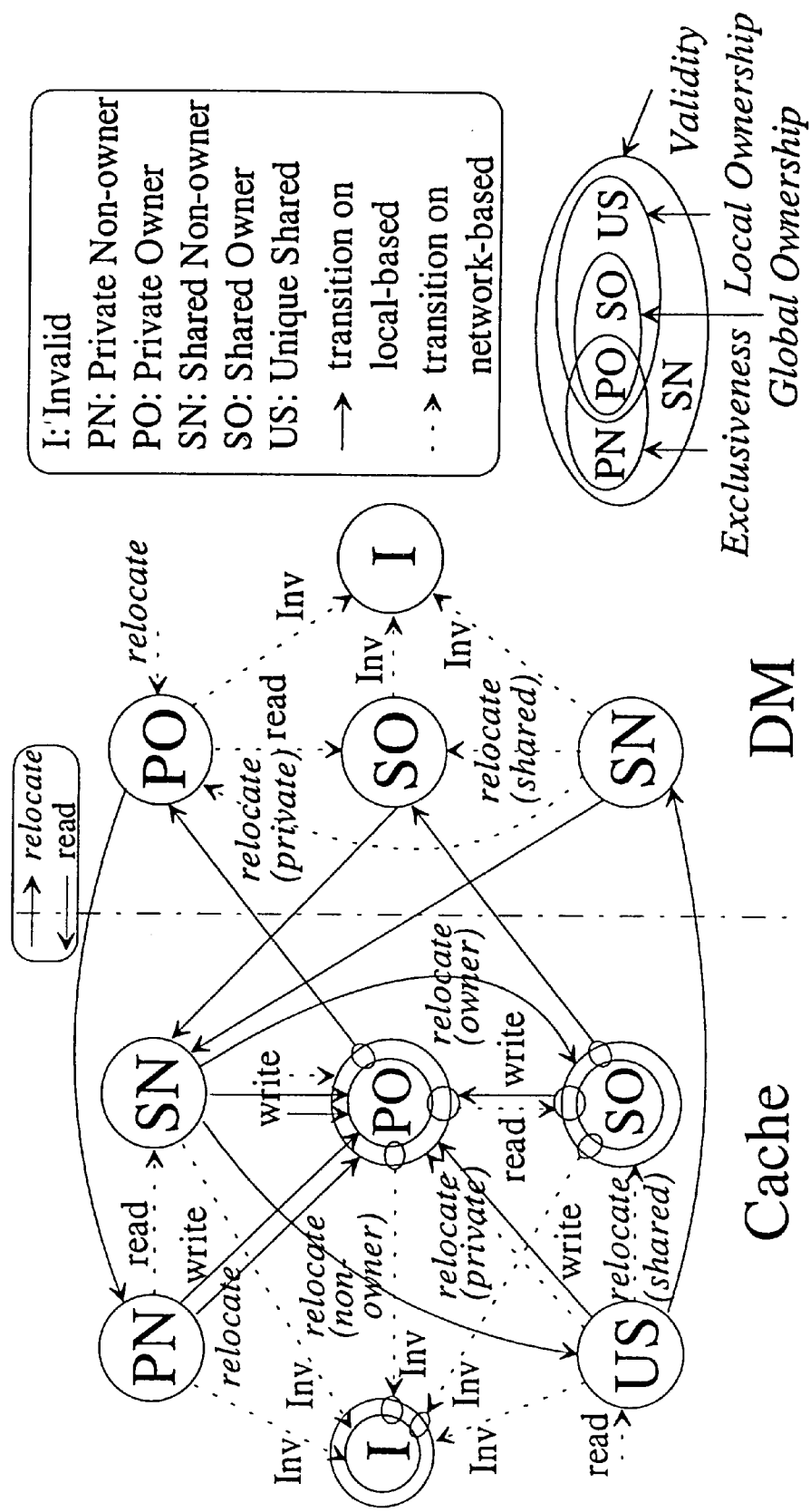
FIG. 4 is an illustration of a means for providing coherence for a DYMA system, i.e., a protocol which provides coherence.

FIG. 4 illustrates the state transition of a preferred coherence protocol for DYMA architecture. Both the states of the processor cache and the local memory are controlled. The coherence protocol comprises eight states in each processor cache block and four states in each DM cache block. The "local bit" described above is combined with the state bits to remove one bit overhead.

In the preferred embodiment of the invention the DYMA coherence protocol provides that a page is first loaded into the DM cache blocks from the secondary storage with all blocks of the page being saved to the DM in a private owner (PO) state to ensure that the blocks have an initial owner state and read access hits at the DM cache blocks at the same node do not cause a change in the state of the first DM cache blocks, wherein the states for copies for read accesses are as follows:

i) when a cache block is copied from its local DM for a read access the block copy assumes a state of:
a. a private non-owner (PN) state if block in the local DM which was copied has a PO state and the state of the local copied DM is unchanged, or b. the block copy assumes a shared non-owner (SN) state if block it copies in the local DM has a state other than PO;

ii) when a block is copied from a remote processor cache block or from a remote DM cache block (i.e., from a remote node) for a read access and the remote block has a PO state:
   a) the block copy is given a unique shared (US) state initially,
   b) the state of the remote processor cache block or of the remote DM cache block is changed to shared owner (SO) state;

iii) when a block is copied from a remote processor cache block or from a remote DM cache block (i.e., from a remote node) for a write access:
   a) the block copy is given a PO state initially,
   b) the state of the remote processor cache block or of the remote DM cache block is changed to the invalid (I) state; and
   c) the states of all copies of the cache block in the DYMA at a node other than the node with the block in the PO state are changed to the I state;

and wherein the state of cache blocks are affected by a cache miss access (for replacement of the cache block) as follows:

i) if a PO or a SO state block is selected for replacement, the block is saved at its DM with the same state (i.e. as a PO or an SO), ii) if a US state block is selected for replacement, the block is saved in the DM with an SN state, iii) if the cache block replaced at the DM is a global block then relocation and replacement of other DM blocks may be necessary (i.e., a global replacement) and the following process is followed:
   a. checking the cache tag for the selected DM block and discovering that the block is in its processor cache at its local location (which checking is not necessary if direct-mapped processor caches are utilized or if higher priority is given to the local block over the global block when selecting a victim block at the DM cache for replacement) and
     1) changing the state of the processor cache block to global PO/SO if it existed in its processor in the PN/SN state at the time the PO/SO DM block was replaced, and
     2) changing the state of its local processor cache block to US if the replaced DM cache block was in the SN state;
   b. checking the cache tag or otherwise ascertaining that a same copy of the replaced DM block is not in its processor's cache at its local location, but at least one copy of the replaced DM copy exists at a remote DM cache block at a remote location, and
     1) changing the state of the single DM block having a US/SN state to the SO state, or
     2) change the state of one of the remote DM cache blocks to the SO state if more copies exist in the US/SN state while leaving the remaining copies in their US/SN state; or
   b. checking the cache tag or otherwise ascertaining that a same copy of the replaced DM cache is not in its processors cache at its local location and that no copy of the replaced DM cache exists at a remote DM cache block at a remote location and saving the replaced DM cache block to a remote node DM cache block in the PO state.

Figure 5:
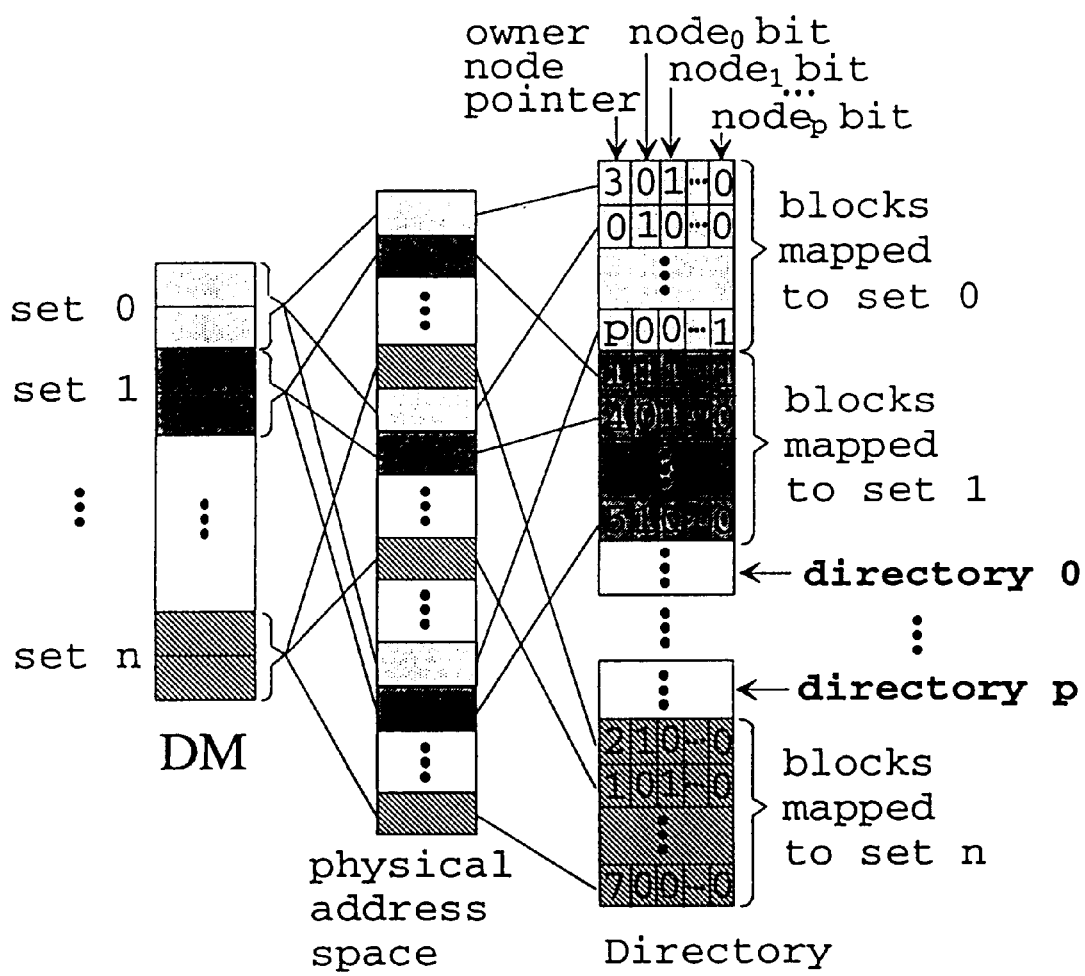
FIG. 5 is an illustration of an address mapping for the directory of a DYMA system, wherein the DM is a 2-way set associative, the number of DM sets is n and the number of nodes is p.
Figure 6:
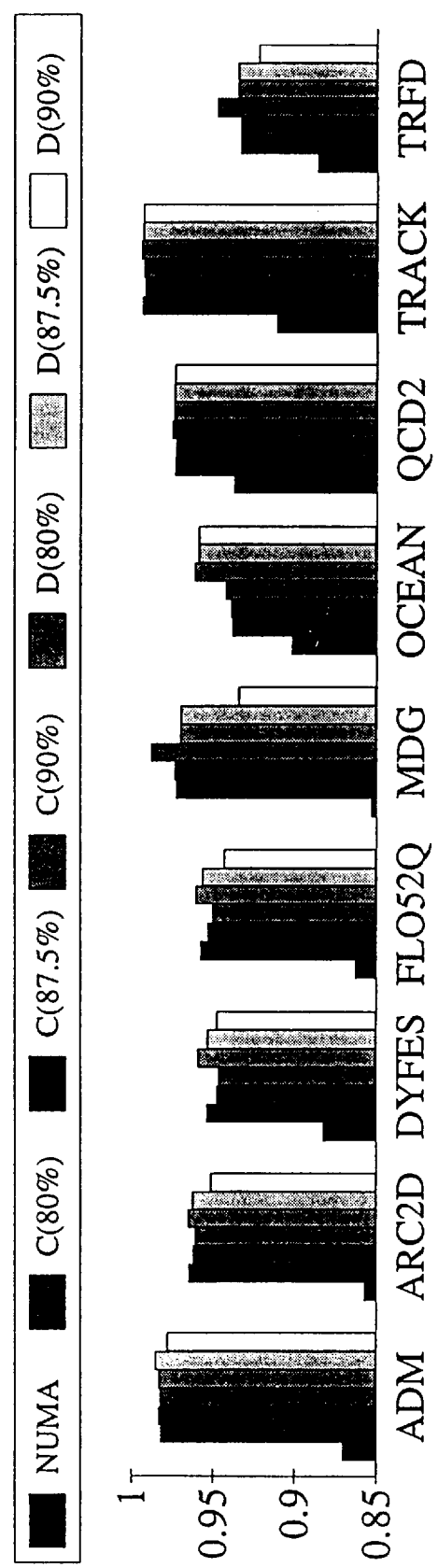
FIG. 6 is an illustration which contrasts (for a COMA system, a CC-NUMA system and a DYMA system) the node hit rates for a master node when 8 processors are used in a memory architecture.
Figure 7:
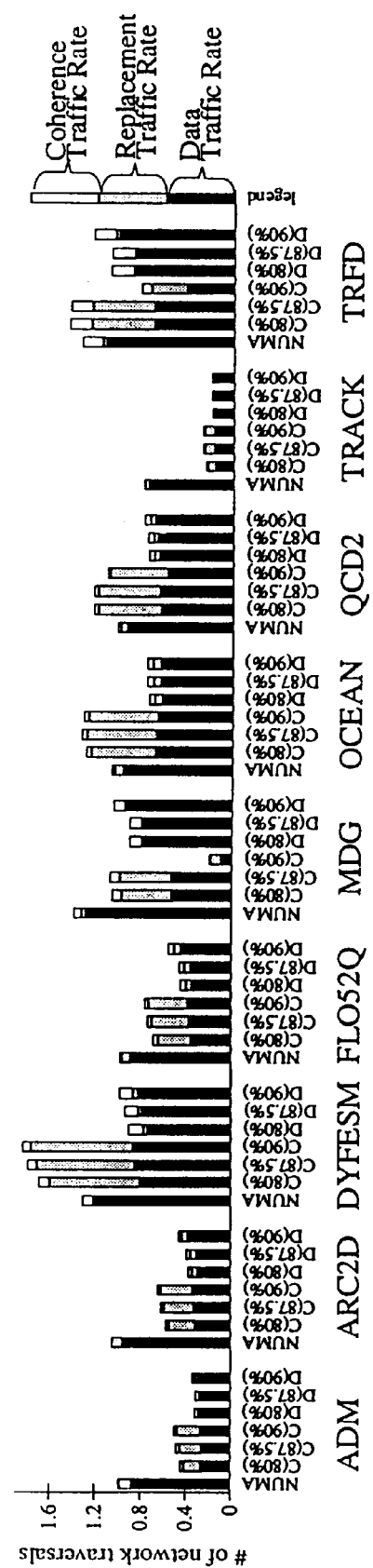
FIG. 7 is an illustration which contrasts (for a COMA system, a CC-NUMA system and a DYMA system) the data traffic generated by the processors when 8 processors are used in a memory architecture.
Figure 8:
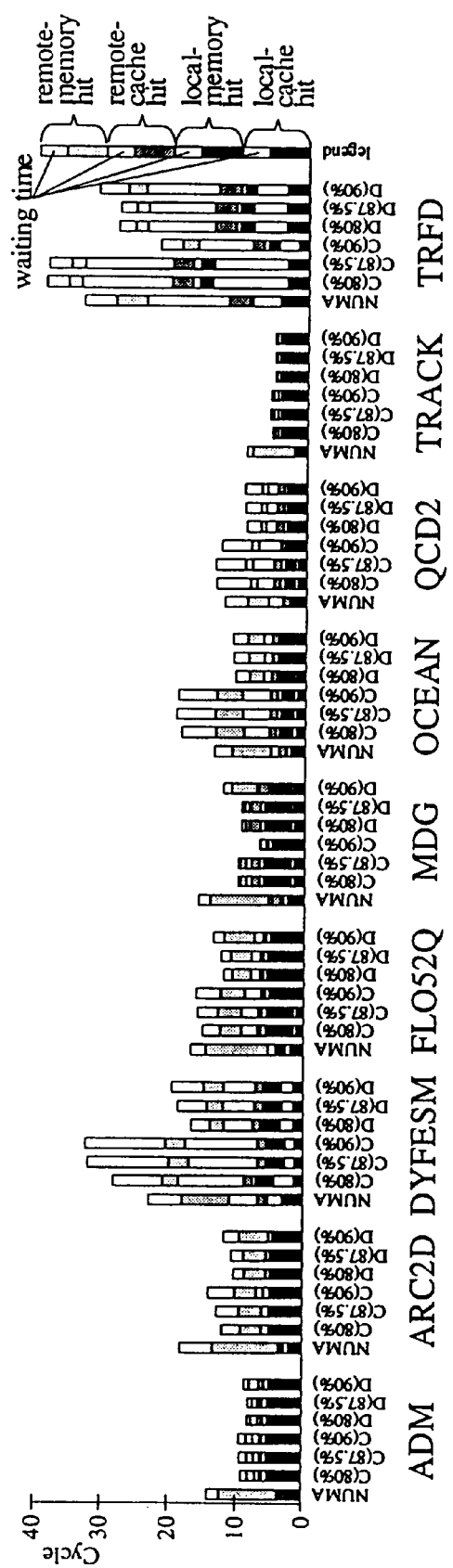
FIG. 8 is an illustration which contrasts (for a COMA system, a CC-NUMA system and a DYMA system) the average latency, including the waiting time due to contention, generated by the processors when 8 processors are used in a memory architecture.
Figure 9:
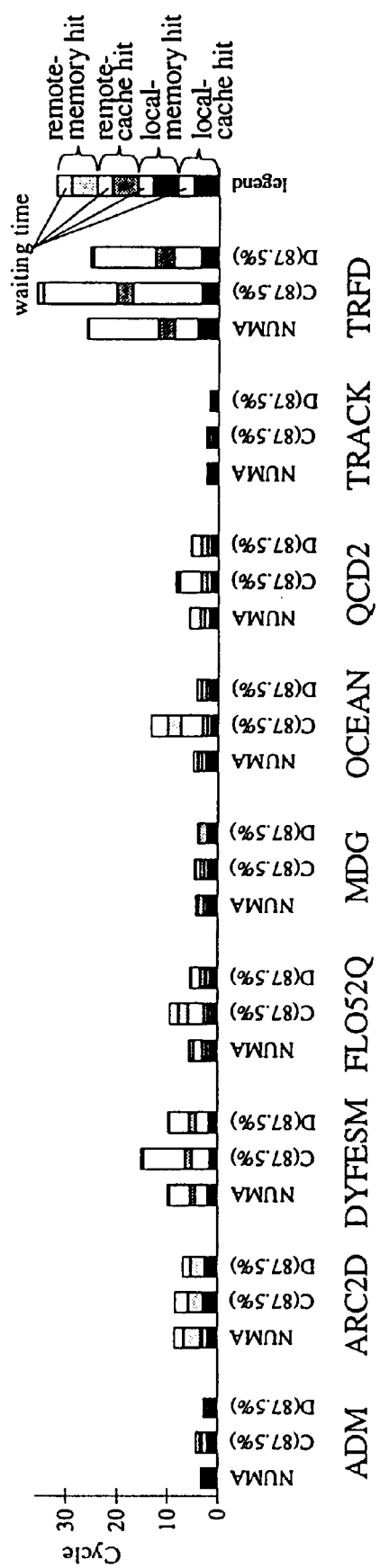
FIG. 9 is an illustration which contrasts (for a COMA system, a CC-NUMA system and a DYMA system) the average latency when the cache size is large (e.g. 512K bytes) generated by the processors when 8 processors are used in a memory architecture.

In a preferred embodiment of the invention unallocated memory space is increased to avoid DM replacements and to minimize network traffic. Also a random node selecting algorithm for DM replacements is preferably avoided. A swapping method also may be used to minimize block replacement traffic or by providing each home directory with the information of all the blocks which are mapped to the same set in the DM as illustrated by FIG. 5. Thus, the home directory is checked to determine the node which has space for the block to be replaced and to thereby avoid further replacements. Such a directory structure aspect of the present coherence protocol might also be advantageously applied to the COMA directory. Further, the protocol of DYMA also may be advantageously applied to the traditional two-level cache protocols.

Stock microprocessors can be utilized in the DYMA architecture with the cache coherence protocol according to the present invention with little difficulty by modifying the coherence protocol. Such adaption of the coherence protocol will be readily apparent to one of ordinary skill in this field upon understanding the present invention. Further, such adaptations would only require the average or routine skill of persons familiar to the present field. For example, an adapted coherence protocol with four states and one local bit for each cache block, which more closely resembles the traditional MESI protocol, can also be utilized with the present invention architecture.

Moreover, if processor cache utilized is the off-chip level-2 cache, implementing the preferred coherence protocol according to the present invention has little bearing on the specifics of the microprocessors. All modern microprocessors with on-chip cache provide necessary signals for implementing multi-level caches with their on-chip caches.

Some examples of performance advantage of the DYMA architecture according to the invention its preferred coherence protocol may be illustrated by a comparison to COMA and CC-NUMA architectures.

To compare the performances of CC-NUMA, COMA and DYMA in terms of latency a test model may be implemented based on write-back between the processor cache and its local memory. Such a simple model can be utilized to demonstrate some of the latency parameters that are related to the latency overhead of each type of memory architecture.

For the study of such latency, memory accesses ("hits") may be divided into 4 different classes: (a) local-cache hit, (b) local-memory hit, (c) remote-cache hit and (d) remote-memory hit. The latency associated with the 4 hit classes may be represented as follows: (a) $L_{lc}$=latency for a local-cache hit, (b) $L_{lm}$=latency for a local-memory hit, (c) $L_{rc}$=latency for a remote-cache hit and (d) $L_{rm}$=latency for a remote-memory hit. Therefore the average latency per reference in each memory architecture can be expressed as follows:

$$H_{lc} L_{lm} + M_{lc} H_{lm} L_{lm} + M_{lc} M_{lm} H_{rc} L_{rc} + M_{lc} M_{lm} M_{rc} L_{rm} \quad (I)$$

wherein
   $H_{lc}$, (=1−$M_{lc}$), is the local-cache hit rate;
   $H_{lm}$, (=1−$M_{lc}$), is the local-memory hit rate;
   $H_{rc}$, (=1−$M_{rc}$), is the remote-cache hit rate.

In Equation (I) four term are separated by a plus ("+") sign. The "average node latency" is represented by the sum of the first two terms separated by a "+" in Equation (I), and the "average remote latency" is represented by the sum of the last two terms separated by a "+" in Equation (I).

Figure 3:
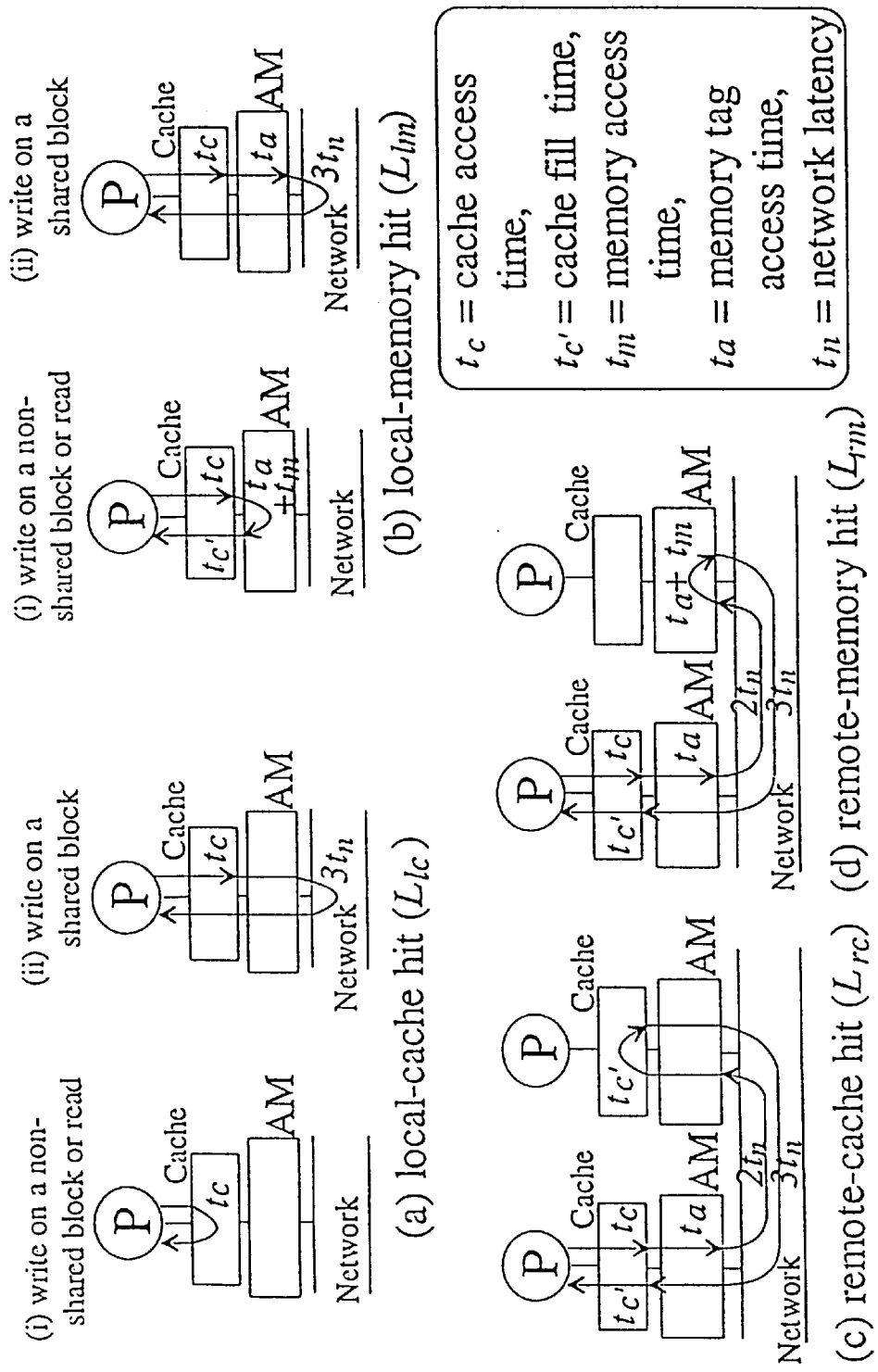
FIG. 3 illustrates the memory access latency in a COMA machine.

FIG. 3 illustrates the latency for each access in a COMA architecture. When a local-cache hit occurs, there are two possible courses of action: (i) write access to a non-shared block or read access; or (ii) write access to a shared block. In the first case the latency is the time for cache access ($t_c$). For simplicity, the equation is based on the assumption that the read access time and the write access time are the same. A write access hit on a shared block requires a coherence action, which may need three network traversals: (1) one sending a signal to the home directory, (2) one sending signals to the nodes which have a copy of the block to be invalidated, and (3) an acknowledgment signal (model does not include processing time at the home directory in order to simplify the calculations). The acknowledgment does not have to go to the home directory since the acknowledgment has synchronization information. Another assumption of the model is that the requesting node, the home directory node and the responding note are different, since the would usually be the case. If each of the three network traversals that the time tnl then the associated latency is $t_c+3t_n$, assuming that the processor stalls until the coherence action is completed under the sequential consistency model. Therefore, the local-cache hit latency, $L_{lc}$ is $(1-P_c^s)t_c+P_c^s (t_c+3t_n)$, wherein $P_c^s$ is the probability that the reference is a write access to a shared block when there is a local-cache hit. Table 1 summarizes the components of the average latency for CC-NUMA, COMA, and DYMA architectures. In Table 1: $P_c^s$=the probability of a write on a shared block when a local-cache is hit; $P_c^c$=the probability of a write on a non-shared unmodified block when a local-cache is hit; $p_c^r$=the probability of a read access when a local-cache is hit; $P_m^s$=the probability of a write on a shared block when a local-memory is hit; $t_c$=cache access time; $t_{c'}$=the cache fill time; $t_m$=memory access time; $t_a$=the tag access time; and $t_n$=the network latency.

Fortran programs from the Perfect Club Benchmark Suite as workloads. Such programs are parallelized by Parafrase-2 as a parallelizing compiler. The number of references considered in each trace and other characteristics are illustrated in Table 2. Although the simulations are done with scaled-down data size and accordingly scaled-down cache and local memory (AM and DM) size, nevertheless the data clearly demonstrate the potential advantages of DYMA.

TABLE 2

Characteristics of the traces.

| Code Name | Application Area | Total Ref. (write %) | Data Size (words) |
|---|---|---|---|
| ADM | Air pollution, Fluid dyn's | 3802575(20.2) | 17255 |
| ARC2D | Supersonic reentry, Fluid dyn's | 60158056(15.7) | 899484 |
| DYFESM | Structural dyn's, Engineering design | 6028514(13.9) | 16451 |
| FLO52Q | Transonic flow, 2-D Fluid dyn's | 72824086(14.9) | 25763 |
| MDG | Liquid water sim., Molecular dyn's | 107182698(19.8) | 29299 |
| OCEAN | Ocean sim., 2-D Fluid dyn's | 17254748(21.7) | 1204 |
| QCD2 | Lattice gauge, Quantum chromodynamics | 31078266(16.0) | 32971 |
| TRACK | Missile tracking, Signal processing | 2773985(16.0) | 21537 |
| TRFD | 2-electron trans. integral, Molecular dyn's | 9446379(14.6) | 14950 |

To accurately simulate the memory access mechanisms for each architecture, the simulator assumes a virtual master clock that governs the progress of the events. If a request arrives at a system unit (network local memory, memory tag,

TABLE 1

The latency of each architecture

| latency type | Node latency | | Remote latency | |
|---|---|---|---|---|
| | local-cache hit ($L_{lc}$) | local-memory hit ($L_{lm}$) | remote-cache hit ($L_{rc}$) | rem.-memory hit ($L_{rm}$) |
| CC-NUMA | $P_c^s(t_c + 3t_n) + P_c^c(t_c + 2t_n) + (1 - P_c^s - P_c^c)t_c$ | $(1 - P_m^s)(t_c + t_m + t_{c'}) + P_m^s(t_c + t_a + 2t_n)$ | $t_c + 2t_n + t_{c'} + 3t_n + t_{c'}$ | $t_c + t_n + t_m + 3t_n + t_{c'}$ |
| COMA | $P_c^s(t_c + 3t_n) + (1 - P_c^s)t_c$ | $(1 - P_m^s)(t_c + t_a + t_m + t_{c'}) + P_m^s(t_c + t_a + 3t_n)$ | $t_c + t_a + 2t_n + t_{c'} + 3t_n + t_{c'}$ | $t_c + t_a + 2t_n + t_{c'} + t_a + t_m + 3t_n + t_{c'}$ |
| DYMA | | | | | where $P_c^s$ = Prob{write on a shared block when local-cache hit}, $P_c^c$ = Prob{write on a non-shared unmodified block when local-cache hit}, $P_c^r$ = Prob{read access when local-cache hit}, $P_m^s$ = Prob{write on a shared block when local-memory hit}, $t_c$ = cache access time, $t_{c'}$ = cache fill time, $t_m$ = memory access time, $t_a$ = tag access time, $t_n$ = network latency The assumptions for the latency model are as follows: 1) the processor restarts after filling the missing block into the cache, 2) the AM and the DM are highly associative in general, 3) the time for memory access and cache fill is overlapped with the coherence action in $L_{lm}$ of COMA and DYMA, 4) the time for returning the missing block is three times longer than the time for sending a request due to the larger size of the returning block, 5) the invalidation when a write hits on a shared block at a remote node is overlapped with the time for returning the block, 6) the time for remote-cache access is equal to the time for the cache fill, 7) the remote AM and the remote cache are concurrently searched for the remote access, 8) there are some state information in the cache of COMA like in DYMA, and 9) when filling the missing block fetched from a remote node into its local cache, both the address and data of the block are saved in the local AM of COMA.

In another contrast of the performance of the three DSM architectures, a trace driven simulator is utilized which uses or processor cache) which is busy serving other requests, the arrived request waits for the completion of the services at the queue. The default simulation parameters are listed in Table 3.

TABLE 3

Default simulation parameters.

| System Unit | Parameters | CC-NUMA | COMA | DYMA |
|---|---|---|---|---|
| | coherence protocol | 5 states | 4 states | 8 & 4 states |
| cache | size (per node) | | 512 bytes | |
| | access time ($t_c$) | | 1 cycle time | |
| | cache fill time ($t_{c'}$) | | 4 cycle times | |
| | associativity | | direct mapped | |
| network | protocol | | distributed directory-based | |
| | service time ($t_n$) | | 10 cycle times | |

TABLE 3-continued

Default simulation parameters.

| System Unit | Parameters | CC-NUMA | COMA | DYMA |
|---|---|---|---|---|
| memory | (total) size | data size | data size | |
| | | | 1 − 1/(# of nodes) | |
| | access time ($t_m$) | | 25 cycle times | |
| | tag access time ($t_a$) | | 16 cycle times | |
| | associativity | | direct mapped | |
| | block size | | 16 bytes | |

The average memory access latency is used as the performance metrics. The average latency per reference consists of the four latencies as discussed above and provide in Equation (I) and the waiting time caused by resource contention. The node hit rate is defined to be the rate of the memory requests causing the local-cache or local-memory hits over the memory requests. The network traffic rate is defined as the average number of network traversals per memory reference. The traffic rate depends on the rate of the cache/node miss, the percentage of shared/owner blocks in a node, and the type of memory references. The three main components of the network traffic are data traffic, replacement traffic and coherence traffic.

The results of the simulation with the three DSM architectures are shown in FIGS. 6–9. The data show that while DYMA may need or complex hardware coherence control, DYMA can provide an opportunity to have relatively small average latency in a large-scale distributed shared-memory multiprocessor system.

It should be understood that the invention is not limited to the illustrated embodiment and that many changes and modifications can be made within the scope of the present invention by a skilled person in the art.

What is claimed is:

1. A method of maintaining cache coherency in a data processing apparatus having a memory access architecture which utilizes distributed shared memory and shared-memory multiprocessors, said apparatus comprising means for storing a home directory and having a plurality of nodes, wherein each node comprises:

(a) a processor,
    (b) at least one processor cache, with said processor cache being characterized by (i) means for storing an address tag, (ii) means for storing a state of the block identifier, (iii) means for storing a local/global identifier, and (iv) means for storing a data block,
    (c) at least one DM cache, with said DM cache being characterized by (i) means for storing an address, (ii) means for storing a state of the block identifier, and (iii) means for storing a data block,
    said cache coherence method comprising the steps of:
    utilizing said at least one DM cache in each node of the shared memory as a backing store for data blocks discarded from the processor cache; and
    delaying address binding to the DM from the block incoming time until the block discarding time when the blocks are discarded from the processor cache, and thereby avoiding enforcement of the inclusion property and long latency due to the inclusion property.

2. A method of maintaining cache coherency in a distributed shared-memory multiprocessor architecture system, said method providing that a page is first loaded into the local memory Dynamic Memory (DM) cache blocks from the secondary storage with all blocks of the page being saved to the DM in a private owner (PO) state to ensure that the blocks have an initial owner state and read access hits at the DM cache blocks at the same node do not cause a change in the state of the first DM cache blocks, wherein the states for copies for read accesses are as follows:

i) when a cache block is copied from its local DM for a read access the block copy assumes a state of:
        a) a private non-owner (PN) state if block in the local DM which was copied has a PO state and the state of the local copied DM is unchanged, or
        b) the block copy assumes a shared non-owner (SN) state if block it copies in the local DM has a state other than PO;
    ii) when a block is copied from a remote processor cache block or from a remote DM cache block (that is, from a remote node) for a read access and the remote block has a PO state:
        a) the block copy is given a unique shared (US) state initially,
        b) the state of the remote processor cache block or of the remote DM cache block is changed to shared owner (SO) state;
    iii) when a block is copied from a remote processor cache block or from a remote DM cache block (that is, from a remote node) for a read access and the remote block has a SO state:
        a) the block copy is given an invalid (I) state initially,
        b) the state of the remote processor cache block or of the remote DM cache block is changed to the PO state; and
        c) the states of all copies of the cache block in the Dynamic Memory Architecture (DYMA) at a node other than the node with the block in the PO state are changed to the I state;

and wherein the state of cache blocks are affected by a write access to a cache block (for replacement of the cache block) as follows:

i) if a PO or a SO state block is selected for replacement, the block is saved at its DM with the same state (that is, as a PO or an SO),
    ii) if a US state block is selected for replacement, the block is saved in the DM with an SN state,
    iii) if the local block replaced at the DM is part of a global cache then location and replacement of other DM blocks may be necessary (that is, a global replacement) and the following process is followed:
        a) checking the cache tag of the replaced DM cache and discovering that the block is in its processor cache at a remote location (which checking is not necessary if direct-mapped processor caches are utilized or if higher priority is given to the local block over the global block when selecting a victim block at the DM cache for replacement) and
            1) changing the state of the remote processor cache block to PO/SO if it existed in the remote processor in the PN/SN state at the time the PO/SO DM block was replaced, and
            2) changing the state of the remote processor cache block to US if the replaced DM cache block was in the SN state;
        b) checking the cache tag or otherwise ascertaining that a same copy of the replaced DM cache is not in its processors cache at a remote location, but at least one copy of the replaced DM copy exists at a remote DM cache block, and 1) changing the state of the single DM block having a US/SN state to the SO state, or
2) changing the state of one of the remote DM cache blocks to the SO state if more copies exist in the US/SN state while leaving the remaining copies in their US/SN state; or c) checking the cache tag or otherwise ascertaining that a same copy of the replaced DM cache is not in its processors cache at a remote location and that no copy of the replaced DM cache exists at a remote DM cache block and saving the replaced DM cache block to a remote node DM cache block in the PO state.

3. A method according to claim 2 wherein said architecture system is a Dynamic Memory Architecture.

* * * * *